(12) United States Patent
Satou et al.

(10) Patent No.: US 10,215,481 B2
(45) Date of Patent: Feb. 26, 2019

(54) REFRIGERATION DEVICE

(71) Applicant: DAIKIN INDUSTRIES, LTD., Osaka-shi, Osaka (JP)

(72) Inventors: Kiichirou Satou, Sakai (JP); Yuusuke Fujimoto, Sakai (JP); Kenji Takata, Osaka (JP); Norio Iga, Osaka (JP)

(73) Assignee: DAIKIN INDUSTRIES, LTD., Osaka-Shi, Osaka (JP)

( * ) Notice: Subject to any disclaimer, the term of this patent is extended or adjusted under 35 U.S.C. 154(b) by 70 days.

(21) Appl. No.: 15/319,566

(22) PCT Filed: Jun. 16, 2015

(86) PCT No.: PCT/JP2015/067348
§ 371 (c)(1),
(2) Date: Dec. 16, 2016

(87) PCT Pub. No.: WO2015/194565
PCT Pub. Date: Dec. 23, 2015

(65) Prior Publication Data
US 2017/0138662 A1 May 18, 2017

(30) Foreign Application Priority Data

Jun. 17, 2014 (JP) .................................. 2014-124264

(51) Int. Cl.
*F25D 29/00* (2006.01)
*F25D 11/00* (2006.01)
(Continued)

(52) U.S. Cl.
CPC ............ *F25D 29/003* (2013.01); *F25B 41/04* (2013.01); *F25B 41/043* (2013.01); *F25B 49/02* (2013.01);
(Continued)

(58) Field of Classification Search
CPC .... F25D 11/003; F25D 29/003; F25D 29/008; F25D 2600/02; F25D 2600/04; F25D 2700/10; F25D 2700/12; F25D 2700/16
See application file for complete search history.

(56) References Cited

U.S. PATENT DOCUMENTS 6,034,607 A 3/2000 Vidaillac
8,538,585 B2 * 9/2013 Thogersen ............ F25D 29/003
165/247
(Continued)

FOREIGN PATENT DOCUMENTS

JP 61-175465 A 8/1986
JP 2000-146399 A 5/2000
(Continued)

OTHER PUBLICATIONS

International Search Report, issued in PCT/JP2015/067348 (PCT/ISA/210), dated Sep. 29, 2015.
(Continued)

*Primary Examiner* — Marc E Norman
(74) *Attorney, Agent, or Firm* — Birch, Stewart, Kolasch & Birch, LLP

(57) ABSTRACT

A refrigeration device includes a blow-out temperature detector that detects the blow-out temperature of air blown out into the interior of the device, a cargo temperature detector that detects the temperature of a cargo, an operation controller that performs cooling control of the interior on the basis of the detection temperature from the blow-out temperature detector and the detection temperature from the cargo temperature detector, a storage unit that stores a first set temperature as a control target value for the blow-out temperature and a cargo target temperature as a target value for the temperature of the cargo, and a time measurement unit that measures a treatment time elapsed for low-temperature treatment of the cargo. The operation controller is
(Continued)

configured to control the refrigerant circuit so that the blow-out temperature approaches the first set temperature. The time measurement unit is configured to start measuring the treatment time when the temperature of the cargo is lower than the cargo target temperature.

14 Claims, 6 Drawing Sheets

(51) Int. Cl.
  *F25B 41/04* (2006.01)
  *F25B 49/02* (2006.01)
  *F25D 17/06* (2006.01)
  *F25B 31/00* (2006.01)
  *F25B 47/02* (2006.01)

(52) U.S. Cl.
  CPC ............ *F25D 11/003* (2013.01); *F25D 17/06* (2013.01); *F25D 29/008* (2013.01); *F25B 31/008* (2013.01); *F25B 47/022* (2013.01); *F25B 2400/075* (2013.01); *F25B 2400/13* (2013.01); *F25B 2600/021* (2013.01); *F25B 2600/0261* (2013.01); *F25B 2700/1931* (2013.01); *F25B 2700/1933* (2013.01); *F25B 2700/21152* (2013.01); *F25B 2700/21171* (2013.01); *F25B 2700/21173* (2013.01); *F25B 2700/21174* (2013.01); *F25B 2700/21175* (2013.01); *F25D 2600/02* (2013.01); *F25D 2600/04* (2013.01); *F25D 2600/06* (2013.01); *F25D 2700/10* (2013.01); *F25D 2700/12* (2013.01); *F25D 2700/16* (2013.01); *Y02B 30/741* (2013.01)

(56) References Cited

U.S. PATENT DOCUMENTS

| | | |
|---|---|---|
| 2010/0293977 A1 | 11/2010 | Tanaka |
| 2013/0000331 A1 | 1/2013 | Hagiwara et al. |

FOREIGN PATENT DOCUMENTS

| | | |
|---|---|---|
| JP | 2003-090660 A | 3/2003 |
| JP | 2005-180751 A | 7/2005 |
| JP | 2007-333275 A | 12/2007 |
| JP | 2008-096028 A | 4/2008 |
| JP | 2009-85501 A | 4/2009 |
| JP | 2009-139000 A | 6/2009 |
| JP | 2010-169361 A | 8/2010 |
| WO | WO 97/37545 A1 | 10/1997 |
| WO | WO 2011/081097 A1 | 7/2011 |

OTHER PUBLICATIONS

Written Opinion of the International Searching Authority, issued in PCT/JP2015/067348 (PCT/ISA/237), dated Sep. 29, 2015.

* cited by examiner

REFRIGERATION DEVICE

TECHNICAL FIELD

The present invention relates to a refrigeration device for a container containing a cargo for transportation.

BACKGROUND ART

There have been known conventional refrigeration devices for containers (see for example Patent Literature 1). When a cargo such as fruits is transported in such a container, quarantine restrictions (for example those by U.S. Department of Agriculture (USDA) or those by Perishable Products Export Control Board (PPECB, export certification agency commissioned by South African Department of Agriculture, Forestry and Fisheries) for pest control are imposed and low-temperature treatment is carried out accordingly so that the temperature of the fruits satisfies a predetermined low temperature condition for a predetermined period in order to prevent pests such as subterranean fruit flies from coming into importing countries together with the transported fruits.

Therefore, if the temperature of fruits in transit does not satisfy the low temperature condition for the predetermined period, the low-temperature treatment is determined to be invalid and the fruits would be denied entry. More specifically, in the low-temperature treatment of fruits, the temperature of the fruits must surely satisfy the low temperature condition for the period determined by the quarantine regulations.

Therefore, the user of the container must carry out cumbersome works of periodically or continuously monitoring the temperature of the interior and the temperature of the cargo and of manually adjusting the set temperature of the refrigeration device from time to time so that the low-temperature treatment is normally carried out.

For example, during the periodic or continuous monitoring, the user must manually change the setting to lower or raise the set temperature of the refrigeration device when the temperature of the cargo tends to approach the upper or lower limit value in the low temperature condition. More specifically, in the conventional refrigeration device, the refrigerant circuit is automatically controlled so that the blow-out temperature approaches the set temperature and the interior is refrigerated, while the automatic control does not take into account fluctuations in the temperature of the cargo, the user must carry out the cumbersome works of periodically or continuously monitoring the temperature of the cargo and manually adjust the set temperature for the blow-out temperature from time to time so that the low-temperature treatment is normally carried out.

CITATION LIST

Patent Literature

Patent Literature 1: Japanese Unexamined Patent Publication No. 2009-085501

SUMMARY OF INVENTION

An object of the present invention is to provide a refrigeration device for a container that can save the user cumbersome works in performing low-temperature treatment to a cargo such as fruits in transit.

A refrigeration device according to the present invention includes a refrigerant circuit having an evaporator and performs low-temperature treatment operation for treating a cargo in an interior of the device under a predetermined low-temperature condition. The refrigeration device includes a blow-out temperature detector, a cargo temperature detector, an operation controller, a storage unit, and a time measurement unit. The blow-out temperature detector detects a blow-out temperature of air which is cooled in the evaporator and blown out into the interior. The cargo temperature detector detects a temperature of the cargo. The operation controller performs cooling control of the interior on the basis of the temperature detected by the blow-out temperature detector and the temperature detected by the cargo temperature detector so that the temperature of the cargo satisfies the low-temperature condition in the low-temperature treatment operation. The storage unit stores a first set temperature as a control target value for the blow-out temperature in the low-temperature treatment operation and a cargo target temperature as a target value for the temperature of the cargo in the low-temperature treatment operation. The time measurement unit measures a treatment time elapsed for low-temperature treatment of the cargo in the low-temperature treatment operation. The operation controller is configured to control the refrigerant circuit so that the blow-out temperature approaches the first set temperature upon starting the low-temperature treatment operation. The time measurement unit is configured to start measuring the treatment time when the temperature of the cargo is lower than the cargo target temperature upon starting the low-temperature treatment operation.

DESCRIPTION OF EMBODIMENTS

[Configuration of Refrigeration Device]

Figure 1:
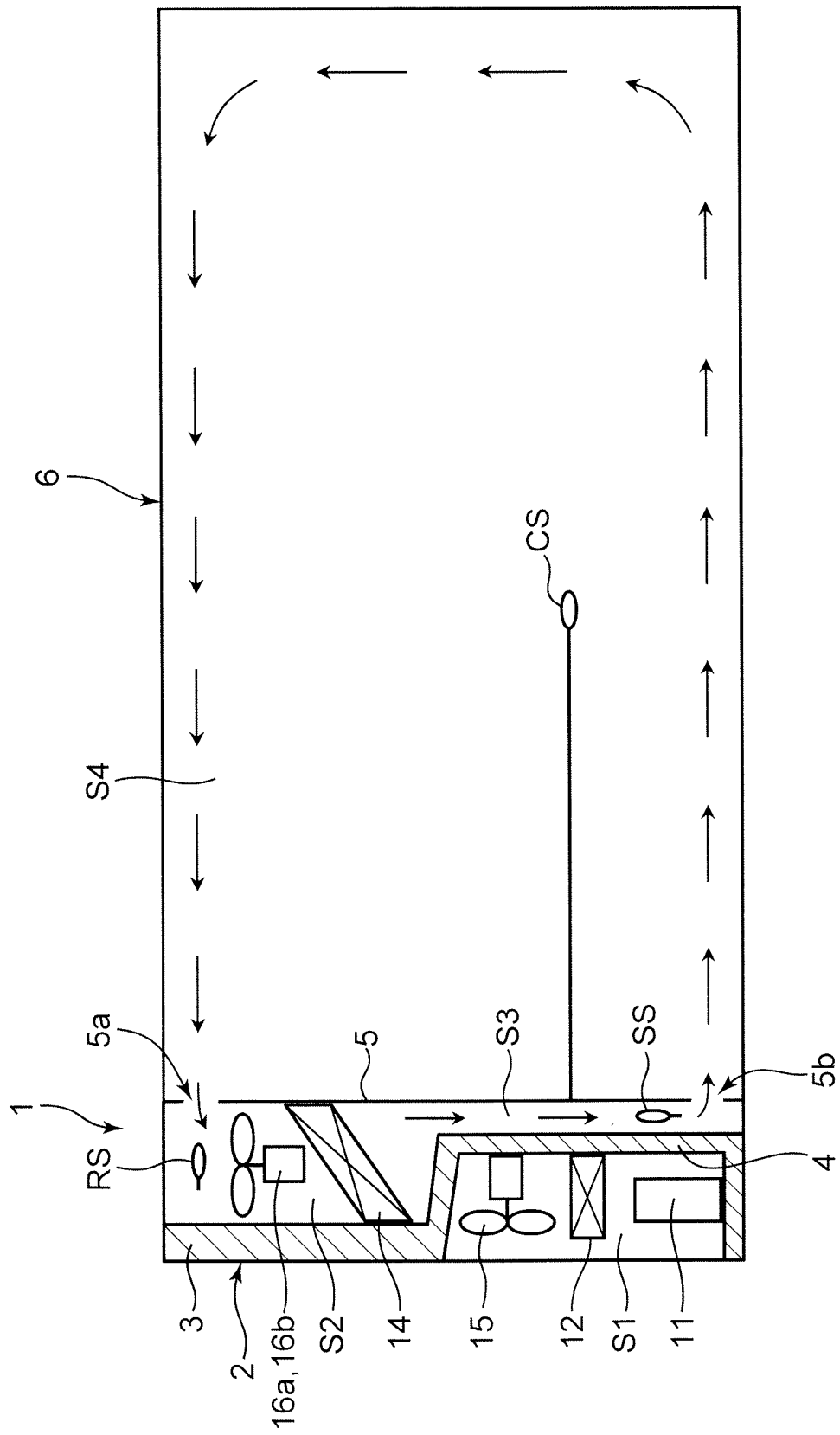
FIG. 1 is a sectional view of a refrigeration device according to one embodiment of the present invention.

Now, a refrigeration device 1 according to one embodiment of the present invention will be described with reference to the drawings. As shown in FIG. 1, the refrigeration device 1 according to the embodiment is configured to refrigerate air in the interior S4 of a container 6 for example for use in marine transportation. The refrigeration device 1 is attached to block the front opening of the container 6 formed in a box shape. The interior S4 of the container 6 is loaded with a cargo such as fruits to be refrigerated. The kind of cargo is not limited to fruits.

The refrigeration device 1 according to the embodiment can automatically carry out low temperature treatment operation to control pests by carrying out low-temperature treatment to the fruits so that a predetermined low-temperature treatment condition is satisfied in order to prevent pests such as subterranean fruit flies from coming into an importing country together with the transported fruits. More specifically, in the low-temperature treatment operation, the refrigeration device 1 can continuously monitor for example the temperature of the interior S4 and the temperature of the cargo and automatically adjust the temperature of the interior S4 and the temperature of the cargo so that the low-temperature treatment is normally carried out.

The low-temperature treatment condition includes a period for the low-temperature treatment and a temperature condition (low temperature condition). Examples of the period for the low-temperature treatment may include, but not limited to, approved time periods for low temperature treatment transport defined under quarantine regulations by, for instance, USDA and PPECB, and examples of the low temperature condition may include, but not limited to, temperature conditions defined under the quarantine regulations by, for instance, USDA and PPECB while other low temperature treatment conditions may be employed. The low-temperature treatment operation will be later described in detail.

A main body wall 2 and a partition 5 are provided at the front opening of the container 6. The main body wall 2 is made for example of a heat insulating material and fixed at the front opening of the container 6 to block the opening. The main body wall 2 includes an upper part 3 and a lower part 4, and the lower part 4 has a recess portion inwardly recessed (toward the interior S4) from the upper part 3. The partition 5 is a plate member which extends in the vertical direction and is provided closer to the interior S4 than the main body wall 2.

The lower part 4 (recess portion 4) of the main body wall 2 forms an outside space S1 outside the interior S4. An upper inside space S2 is formed between the upper part 3 of the main body wall 2 and the partition 5. A lower inside space S3 is formed between the lower part 4 of the main body wall 2 and partition 5. A compressor 11, an outdoor heat exchanger 12 such as a condenser, an outdoor fan 15, etc. are provided in the outside space S1. An evaporator 14, indoor fans 16a and 16b, an suction temperature sensor RS (suction temperature detector), etc. are provided in the upper inside space S2. A blow-out temperature sensor SS (blow-out temperature detector), etc. are provided in the lower inside space S3. A cargo is stored in the interior S4. A cargo temperature sensor CS (cargo temperature detector), etc. are provided in the interior S4.

An suction inlet 5a which communicates the upper inside space S2 and the interior S4 is provided at the upper part of the partition 5, and a blow-out outlet 5b which communicates the lower inside space S3 and the interior S4 is provided at the lower part of the partition 5. When the indoor fans 16a and 16b are operated, air in the interior S4 is made to come into the upper inside space S2 through the suction inlet 5a and sent to the evaporator 14. The input air sent to the evaporator 14 has heat exchange with refrigerant at the evaporator 14 and then is made to blow out into the interior S4 through the blow-out outlet 5b via the lower inside space S3. The air blown out into the interior S4 circulates within the interior S4 and again comes into the upper inside space S2 through the suction inlet 5a. FIG. 1 generally shows the flow of air circulating in the interior S4 by the arrow but the flow of air is not limited to the path indicated by the arrow.

The suction temperature sensor RS is adapted to detect the temperature of air (the temperature of drawn-in air) in the interior S4 to be sent to the evaporator 14. More specifically, the suction temperature sensor RS can detect the temperature of the interior. The suction temperature sensor RS is provided upstream of the evaporator 14 in the flow of air in the upper inside space S2. For example, the suction temperature sensor RS is provided in a path for the air from the suction inlet 5a to the evaporator 14 in the upper inside space S2. One or more suction temperature sensors RS are provided.

The blow-out temperature sensor SS is adapted to detect the temperature of air blown out into the interior S4 (blow-out air temperature). The blow-out temperature sensor SS is provided downstream of the evaporator 14 in the flow of air. The blow-out temperature sensor SS is provided for example in a path for air from the evaporator 14 to the blow-out outlet 5b in the lower inside space S3. One or more blow-out temperature sensors SS are provided.

The cargo temperature sensor CS is adapted to detect the temperature of a cargo. The cargo temperature sensor CS is a temperature sensor provided separately from the suction temperature sensor RS and the blow-out temperature sensor SS. The cargo temperature sensor CS may be a contact type temperature sensor or a non-contact type temperature sensor. The cargo temperature sensor CS is preferably used while the temperature detecting portion of the cargo temperature sensor CS is inserted in the cargo from the view point of accurately measuring the temperature of the inside of the cargo (for example inside the fruit) in the interior S4. One or more cargo temperature sensors CS are provided.

[Configuration of Refrigerant Circuit]

Figure 2:
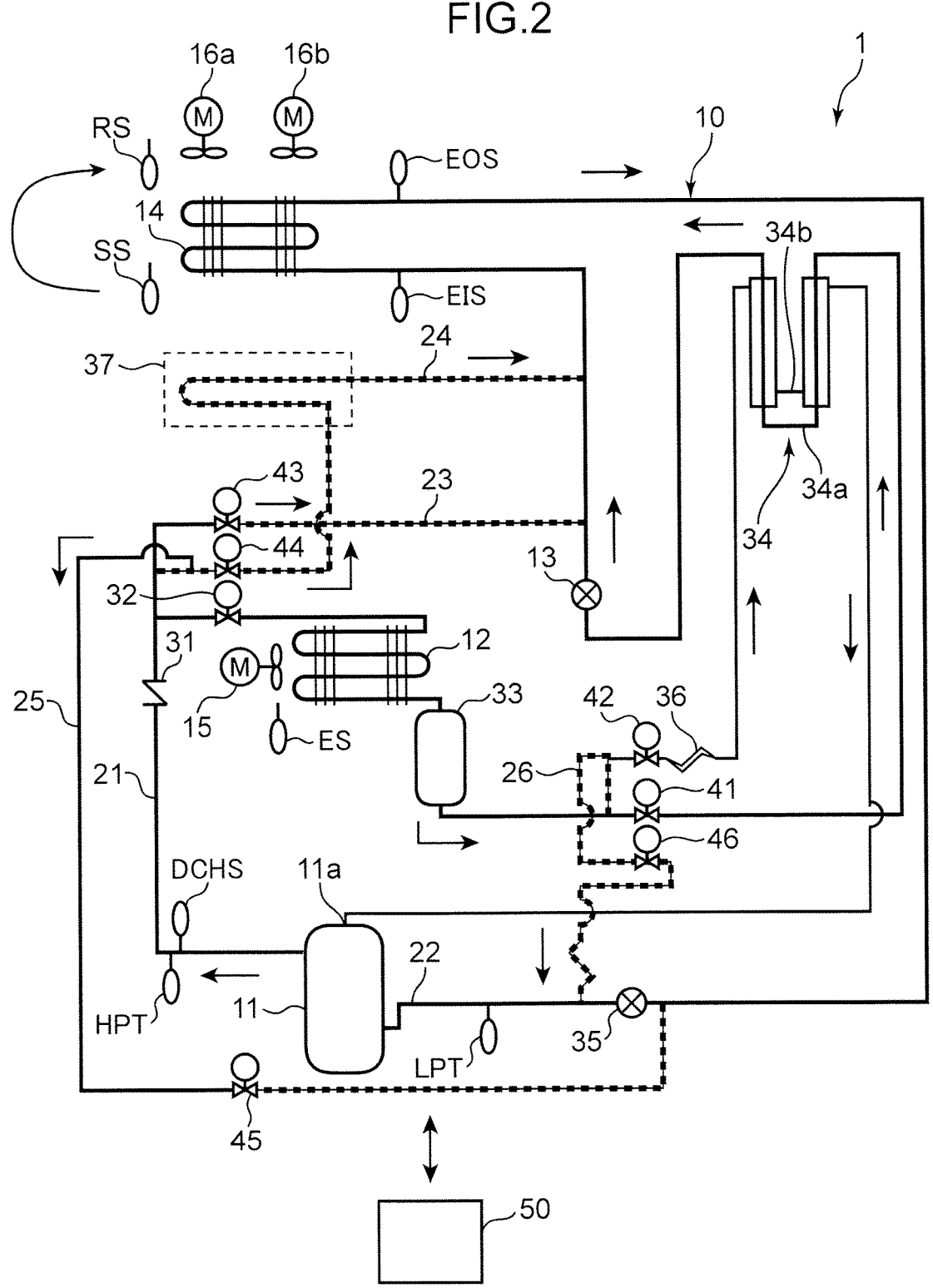
FIG. 2 is a diagram of a refrigerant circuit in the refrigeration device according to the embodiment.

As shown in FIG. 2, the refrigeration device 1 includes a refrigerant circuit 10. The refrigerant circuit 10 includes the compressor 11, the outdoor heat exchanger 12, an expansion valve 13, the evaporator (indoor heat exchanger) 14, and pipes provided to connect these devices. In the refrigeration device 1, refrigerant circulates in the refrigerant circuit 10, and vapor compression freezing cycles are carried out. The refrigeration device 1 includes a controller 50 that controls the refrigerant circuit 10.

The compressor 11 may be a fixed capacity type compressor having a compressor motor operated at fixed speed or a variable capacity type compressor having a compressor motor operated at variable speed by an inverter. The refrigeration device 1 may be provided with a plurality of compressors 11.

The outdoor heat exchanger 12 is adapted to radiate the heat of refrigerant coming into the outdoor heat exchanger 12 to the outside. The outdoor fan 15 is provided in the vicinity of the outdoor heat exchanger 12 to form the flow of outdoor air toward the outdoor heat exchanger 12. In the outdoor heat exchanger 12, heat exchange is carried out between outdoor air sent by the outdoor fan 15 to the outdoor heat exchanger 12 and the refrigerant. The outdoor heat exchanger 12 may be, but not limited to, a cross fin type finned tube heat exchanger including a heat transfer pipe and a plurality of fins. The outdoor heat exchanger 12 may function as a condenser.

The expansion valve 13 is adapted to decompress high-pressure refrigerant radiated at the outdoor heat exchanger 12 until the refrigerant attains a low pressure. The expansion valve 13 may include an opening adjustable electronic expansion valve.

The evaporator 14 is adapted to radiate the heat of air taken in from the interior S4 into the refrigerant let out from the expansion valve 13, evaporate the refrigerant, and cool the suction air. The indoor fans 16a and 16b are adapted to form the flow of inside air toward the evaporator 14 are provided in the vicinity of the evaporator 14. In the evaporator 14, heat exchange is carried out between the inside air sent by the indoor fans 16a and 16b to the evaporator 14 and the refrigerant. The evaporator 14 may be, but not limited to, a cross fin type finned tube heat exchanger including for example a heat transfer pipe and a plurality of fines. Note that the refrigeration device 1 according to the embodiment includes the two indoor fans 16a and 16b but the number of the indoor fans does not have to be limited to the above, and only one such indoor fan may be provided.

The discharge pipe 21 of the compressor 11 is connected to the inflow end of the outdoor heat exchanger 12 through a check valve 31 and a discharge pressure regulating valve 32. The outflow end of the outdoor heat exchanger 12 is connected to the expansion valve 13 through a receiver 33, a liquid electromagnetic valve 41, and a high-pressure side flow path 34a of an economizer heat exchanger 34. An suction pipe 22 of the compressor 11 is connected to the outflow end of the evaporator 14 through an suction proportional valve (suction regulating valve) 35. The inflow end of the evaporator 14 is connected to the expansion valve 13.

The economizer heat exchanger 34 is adapted to carry out heat-exchange between refrigerant passed through the high-pressure side flow path 34a and refrigerant passed through a low-pressure side flow path 34b. The inflow end of the low-pressure side flow path 34b is connected to a pipe between the receiver 33 and the liquid electromagnetic valve 41 through a capillary tube 36 and an economizer electromagnetic valve 42. The outflow end of the low-pressure side flow path 34b is connected to an intermediate suction inlet 11a of the compressor 11. The intermediate suction inlet 11a is in communication at a position in the compression mechanism of the compressor 11 where refrigerant is in the process of compression (closer to the low-pressure side).

The suction proportional valve 35 serves as a flow regulating valve adapted to regulate the amount of the refrigerant circulating in the refrigerant circuit 10 by regulating the amount of refrigerant to be taken in by the compressor 11. The suction proportional valve 35 is controlled so that the blow-out temperature of air blown out toward the interior S4 is kept within a prescribed range (for example within the range of ±0.5° C.) from a control target value (set temperature) by the controller 50 during chilled state operation, frozen state operation, low-temperature treatment operation, and the like that will be described.

The suction proportional valve 35 is adjusted to have a reduced opening degree by the controller 50 when the blow-out temperature is lower than the set temperature in refrigeration operation, so that the flow amount of refrigerant taken into the compressor 11 is reduced. As a result, the flow amount of the refrigerant discharged from the compressor 11 is reduced, and the flow amount of the refrigerant passed to the evaporator 14 is reduced, so that the refrigeration capability of the evaporator 14 is reduced. In this way, the interior S4 can be prevented from being excessively refrigerated. In the meantime, the suction proportional valve 35 is adjusted to have an opening degree increased by the controller 50 when the blow-out temperature exceeds the set temperature in the refrigeration operation, so that the amount of the refrigerant taken into the compressor 11 is increased. As a result, the flow amount of the refrigerant discharged from the compressor 11 increases and the flow amount of the refrigerant to the evaporator 14 increases, so that the refrigeration capability of the evaporator 14 is increased. In this way, the refrigeration of the interior S4 is accelerated.

The flow amount of the refrigerant may be regulated by adjusting the operation capacity of the compressor 11 without using the suction proportional valve 35. When the operation capacity of the compressor 11 is adjusted, the suction proportional valve 35 can be omitted in the refrigerant circuit 10. Note however that the regulating of flow amount of the refrigerant may be carried out both by adjusting the operation capacity of the compressor 11 and by adjusting the opening degree of the suction proportional valve 35.

More specifically, the compressor 11 is controlled to have a smaller operation capacity by the controller 50 when the blow-out temperature is less than the set temperature in the refrigeration operation. As a result, the flow amount of the refrigerant discharged from the compressor 11 is reduced and the flow amount of the refrigerant passed to the evaporator 14 is reduced, so the refrigeration capability of the evaporator 14 is reduced. In this way, the interior S4 can be prevented from being excessively refrigerated. In the meantime, the compressor 11 is controlled to have a greater operation capacity by the controller 50 when the blow-out temperature exceeds the set temperature in the refrigeration operation. As a result, the flow amount of the refrigerant discharged from the compressor 11 is increased and the flow amount of the refrigerant passed to the evaporator 14 is increased, so that the refrigeration capability of the evaporator 14 is increased. In this way, the refrigeration of the interior S4 can be accelerated.

A specific means for adjusting the operation capacity of the compressor 11, in other words, a specific means for controlling the volume of the refrigerant using the compressor 11 may be as follows.

When for example the compressor 11 is a variable capacity compressor with an inverter, the operation capacity of the compressor 11 can be controlled by adjusting the frequency (number of revolutions) of the motor of the compressor 11. More specifically, the motor of the compressor 11 is supplied with power through the inverter (not shown). When the frequency of AC supplied from the inverter to the motor (i.e., the operation frequency of the compressor 11) is changed, the number of revolutions of the motor changes, so that the operation capacity of the compressor 11 changes. When for example the compressor 11 is a fixed capacity type compressor having a motor operated at fixed rotation speed, the operation capacity of the compressor 11 can be controlled by intermittently operating the motor of the compressor 11.

The refrigerant circuit 10 is connected with a first defrosting pipe 23, a second defrosting pipe 24, a discharge gas bypass pipe 25, and a liquid injection pipe 26. The first and second defrosting pipes 23 and 24 are pipes for defrosting operation that are connected to branch from the discharge pipe 21 of the compressor 11, introduce refrigerant discharged from the compressor 11 into the evaporator 14 and melt frost sticking to the evaporator 14. The first and second defrosting pipes 23 and 24 each have one end connected between the check valve 31 and the discharge pressure regulating valve 32 and the other end connected between the expansion valve 13 and the evaporator 14.

The first defrosting pipe 23 is provided with a hot gas electromagnetic valve 43 opened during defrosting operation. The second defrosting pipe 24 is provided with a defrosting electromagnetic valve 44 opened during defrosting operation and a drain pan heater 37. The drain pan heater 37 is provided in a drain pan (not shown) for receiving frost and dew condensation water removed from the surface of the evaporator 14. Therefore, during defrosting operation, as refrigerant discharged from the compressor 11 is distributed to the drain pan heater 37, frost or ice lumps of dew condensation water collected in the drain pan absorb heat from the refrigerant discharged from the compressor 11 and melt.

The discharge gas bypass pipe 25 is adapted to return part of refrigerant discharged from the compressor 11 to the suction side of the compressor 11 for example when the refrigeration capability of the evaporator 14 is excessive. The discharge gas bypass pipe 25 also serves as an oil return pipe used to return refrigerating machine oil in refrigerant discharged from the compressor 11 to the suction side of the compressor 11. The discharge gas bypass pipe 25 has one end connected between the check valve 31 and the defrosting electromagnetic valve 44 and the other end connected between the evaporator 14 and the suction proportional valve 35. The discharge gas bypass pipe 25 is provided with a discharge gas bypass electromagnetic valve 45 opened as required according to a prescribed operation condition during refrigeration operation.

The liquid injection pipe 26 is a pipe for so-called liquid injection carried out to return liquid refrigerant condensed in the outdoor heat exchanger 12 to the suction side of the compressor 11. The liquid injection pipe 26 has one end connected between the receiver 33 and the liquid electromagnetic valve 41 and the other end connected between the suction proportional valve 35 and the compressor 11. The liquid injection pipe 26 is for example provided with an injection electromagnetic valve 46 opened as required according to a prescribed operation condition during refrigeration operation.

The refrigeration device 1 is provided with various sensors in addition to the suction temperature sensor RS and the blow-out temperature sensor SS. An evaporator inlet temperature sensor EIS that detects the temperature of refrigerant at the inlet of the evaporator is provided on the inlet side of the evaporator 14, and an evaporator outlet temperature sensor EOS that detects the temperature of refrigerant at the outlet of the evaporator is provided on the outlet side of the evaporator 14. An outdoor air temperature sensor ES that detects outdoor air temperature is provided in the vicinity of the outdoor heat exchanger 12.

The discharge pipe 21 of the compressor 11 is provided with a discharge temperature sensor DCHS that detects the temperature of refrigerant discharged from the compressor 11 and a high-pressure sensor HPT that detects the pressure of refrigerant discharged from the compressor 11. The suction pipe 22 of the compressor 11 is provided with a low-pressure sensor LPT that detects the pressure of refrigerant taken into the compressor 11.

Figure 3:
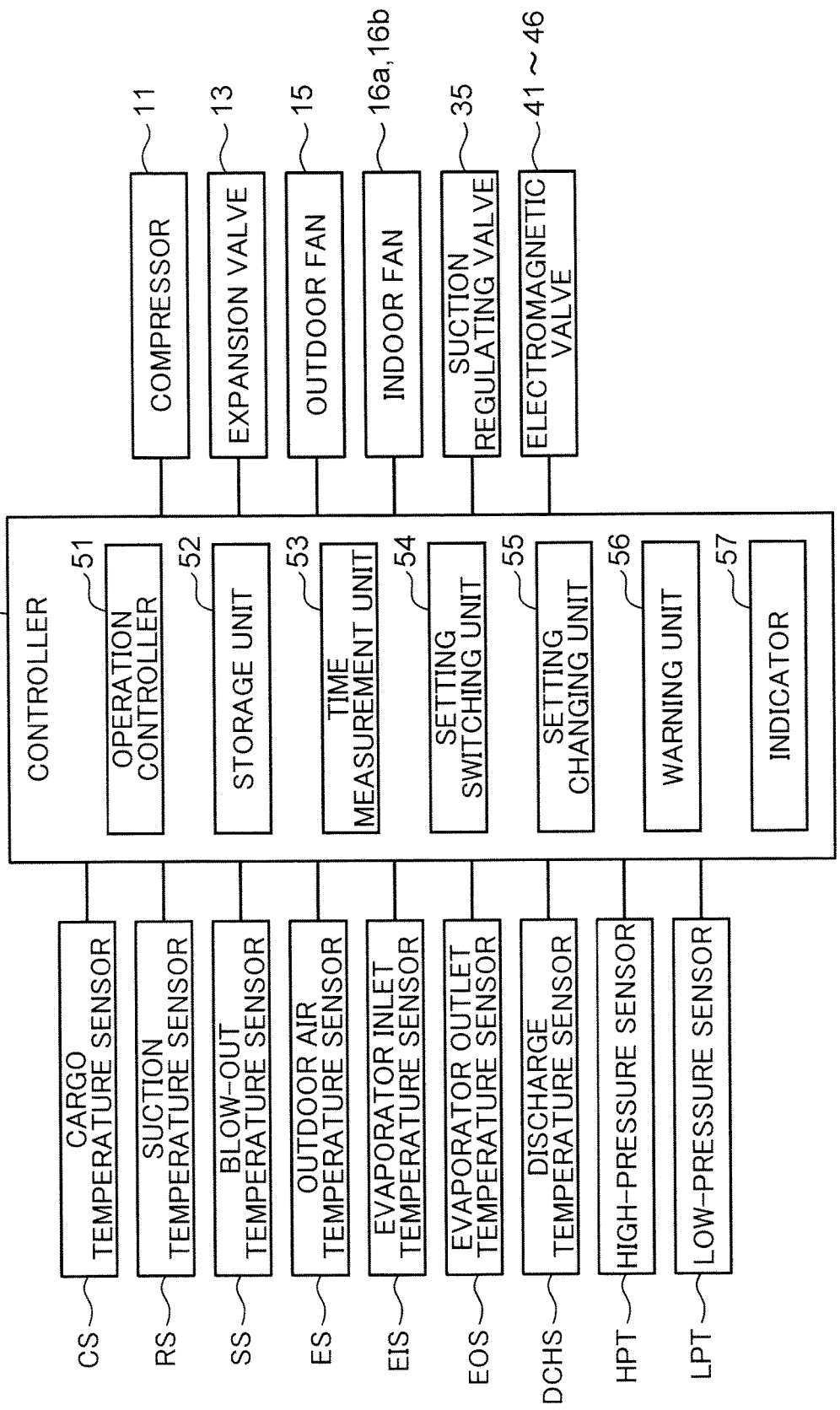
FIG. 3 is a block diagram of a general configuration of a control system and a main mechanism in the refrigeration device according to the embodiment.

FIG. 3 is a block diagram of a general configuration of a control system and a main mechanism in the refrigeration device 1. As shown in FIG. 3, the controller 50 controls the compressor 11, the expansion valve 13, the outdoor fan 15, the indoor fans 16a and 16b, the suction proportional valve (suction regulating valve) 35, and the electromagnetic valves 41 to 46 for example on the basis of temperatures, pressures and the like, detected in the various sensors.

The controller 50 includes for example a central processing unit (CPU) and a microcomputer provided with memories (a storage unit 52) such as a ROM and a RAM. According to the embodiment, the controller 50 may have, as functions, an operation controller 51, the storage unit 52, a time measurement unit 53, a setting switching unit 54, a setting changing unit 55, a warning unit 56 and an indicator 57.

According to the embodiment, the storage unit 52 stores various control programs corresponding to the functions of the operation controller 51, the time measurement unit 53, the setting switching unit 54, the setting changing unit 55, the warning unit 56, and the indicator 57, and as the various control programs run by the CPU, the operation of the mechanisms is controlled. In this way, the refrigerant circuit 10 is controlled in the refrigeration device 1.

The operation controller 51 switches in the refrigerant circuit 10 among various kinds of operation including the frozen state operation, the chilled state operation, the defrosting operation, and the low-temperature treatment operation, and performs control on each of the operations. The operation controller 51 performs the chilled state operation when the set temperature as a control target value is a higher temperature (for example 10° C.) than a prescribed temperature (for example −10° C.). The operation controller 51 performs the frozen state operation when the set temperature as a control target value is a lower temperature (for example −20° C.) than a prescribed temperature (for example −10° C.). The operation controller 51 performs the defrosting operation when a predetermined condition is satisfied. The operation controller 51 performs the low-temperature treatment operation that will be described for example in response to an instruction input by the user or a user instruction given through a communication means.

The storage unit 52 stores a plurality of set temperatures as control target values for the blow-out temperature in the low-temperature treatment operation and a cargo target temperature as a target value for the temperature of a cargo in the low-temperature treatment operation. The time measurement unit 53 measures a treatment time elapsed for low-temperature treatment to the cargo in the low-temperature treatment operation. The setting switching unit 54 switches the control target values for the blow-out temperature in the low-temperature treatment operation.

The setting changing unit 55 accepts various instruction inputs from the user in relation to the operation of the refrigeration device 1. The setting changing unit 55 can accept at least one of setting change of the control target value by the user's input and setting change of the control target value through a communication means and can change the control target value to the accepted value.

The warning unit 56 issues a warning when the temperature of the cargo satisfies a predetermine condition. More specifically, the warning unit 56 may issue a warning when the cargo temperature exceeds a cargo reference temperature. The warning unit 56 may issue a warning when the temperature of the cargo continues to exceed the cargo reference temperature for a prescribed period. The warning unit 56 may issue a warning when the cargo temperature exceeds a cargo upper limit temperature. The warning unit 56 may issue a warning when the temperature of the cargo continues to exceed the cargo upper limit temperature for a prescribed period.

The indicator 57 indicates a data piece extracted from accumulated data pieces related to the low-temperature treatment operation. The data piece extracted from the accumulated data pieces related to the low-temperature treatment operation is indicated by the indicator 57, so that the user can be easily notified of data for example about normal execution of the low-temperature treatment, an abnormality occurring in the low-temperature treatment, normal completion of the low-temperature treatment, treatment time elapsed for the low-temperature treatment (for example elapsed time and remaining time), and the remaining time for low-temperature treatment. The user may set kinds of data to be extracted as required.

In a specific example, the indicator 57 can extract a data piece particularly needed by the user from accumulated data pieces related to the low-temperature treatment in linked timing with the start of counting by a low-temperature treatment timer in the low-temperature treatment operation that will be described and have the data indicated in a partly highlighted manner on the screen or printed out. The indicator 57 can extract, during low-temperature treatment operation, for example change with time in the temperature of the cargo, change with time in the blow-out temperature, a cargo target temperature, a control target value for the blow-out temperature (set temperature), a starting point for counting by the low-temperature treatment timer, and a completion point for the low-temperature treatment from the accumulated data related to the low-temperature treatment operation.

When refrigeration operation such as the child state operation, the frozen state operation, and the low-temperature treatment operation is carried out, refrigerant compressed in the compressor 11 comes into the outdoor heat exchanger 12 through the discharge pipe 21. In the outdoor heat exchanger 12, the refrigerant radiates heat to the outdoor air and condenses. Then, the refrigerant is passed via the high-pressure side flow path 34a of the economizer heat exchanger 34 via the receiver 33. The liquid refrigerant is then decompressed as it passes through the expansion valve 13 and comes into the evaporator 14. In the evaporator 14, the refrigerant absorbs heat from the indoor air and is evaporated. This refrigerates the interior S4. The refrigerant evaporated in the evaporator 14 passes the suction proportional valve 35 and then taken into the compressor 11.

[Low-Temperature Treatment Operation]

Now, exemplary low-temperature treatment operation will specifically be described. The low-temperature treatment operation starts for example in response to an instruction input by the user or an instruction by the user given through a communication means. The refrigeration device 1 automatically performs low-temperature treatment operation to carry out low-temperature treatment to a cargo such as fruits so that a predetermined low-temperature treatment condition is satisfied and pest is controlled.

As described above, the low-temperature treatment condition includes a period for carrying out low-temperature treatment and a temperature condition (low temperature condition). The period for performing the low-temperature treatment is for example an approved period for low-temperature treatment transport defined under quarantine regulations and the low temperature condition is for example a cargo temperature condition defined under the quarantine regulations. In the low-temperature treatment operation, the operation controller 51 carries out such control that the interior S4 is refrigerated on the basis of a temperature detected by the blow-out temperature sensor SS and a temperature detected by the cargo temperature sensor CS so that the temperature of the cargo satisfies the low temperature condition. More specifically, the operation controller 51 controls the refrigerant circuit 10 on the basis of a temperature detected by the blow-out temperature sensor SS, starts measuring treatment time on the basis of a temperature detected by the cargo temperature sensor CS, and switches a control target value for the blow-out temperature from a first set temperature to a second set temperature on the basis of a temperature detected by the cargo temperature sensor CS. In this way, the temperature of the cargo is automatically controlled to satisfy the low temperature condition.

In the low-temperature treatment operation, the temperature of the cargo in the interior S4 is adjusted, for example, to be not higher than a cargo reference temperature in order to satisfy the low-temperature treatment condition. Then, the state in which the temperature of the cargo is not higher than the cargo reference temperature is maintained for a predetermined period. In order to reduce adverse effects on the quality of the cargo attributable to a drop in the temperature of the cargo, the temperature of the cargo is preferably kept to be not less than the cargo lower limit temperature which is lower than the cargo target temperature by a predetermined temperature. The temperature of the cargo is preferably adjusted to be within a target range determined with reference to the cargo target temperature.

According to the embodiment, in the low-temperature treatment operation, the temperature of the cargo is adjusted to approach the cargo target temperature lower than the cargo reference temperature. Then, in order to adjust the temperature of the cargo to the cargo target temperature, the operation controller 51 controls the refrigerant circuit 10 so that the blow-out temperature is adjusted to a predetermined control target value.

In the low-temperature treatment operation, when the temperature of the cargo exceeds the cargo reference temperature, time for low-temperature treatment of the cargo is extended for a predetermined period (or the low-temperature treatment timer is extended). Also in the low-temperature treatment operation, when the temperature of the cargo exceeds the cargo upper limit temperature, the treatment time measured up to the point is reset (the low-temperature treatment time up to the point is invalidated and the low-temperature timer is cleared). In the low-temperature treatment operation, when the predetermined period in which the temperature of the cargo is maintained at the cargo reference temperature or lower is elapsed, the low-temperature treatment operation ends.

The general procedure of the low-temperature treatment operation has been described, and a specific example of the low-temperature treatment operation will be described in the following.

Control Example 1

Figure 4:
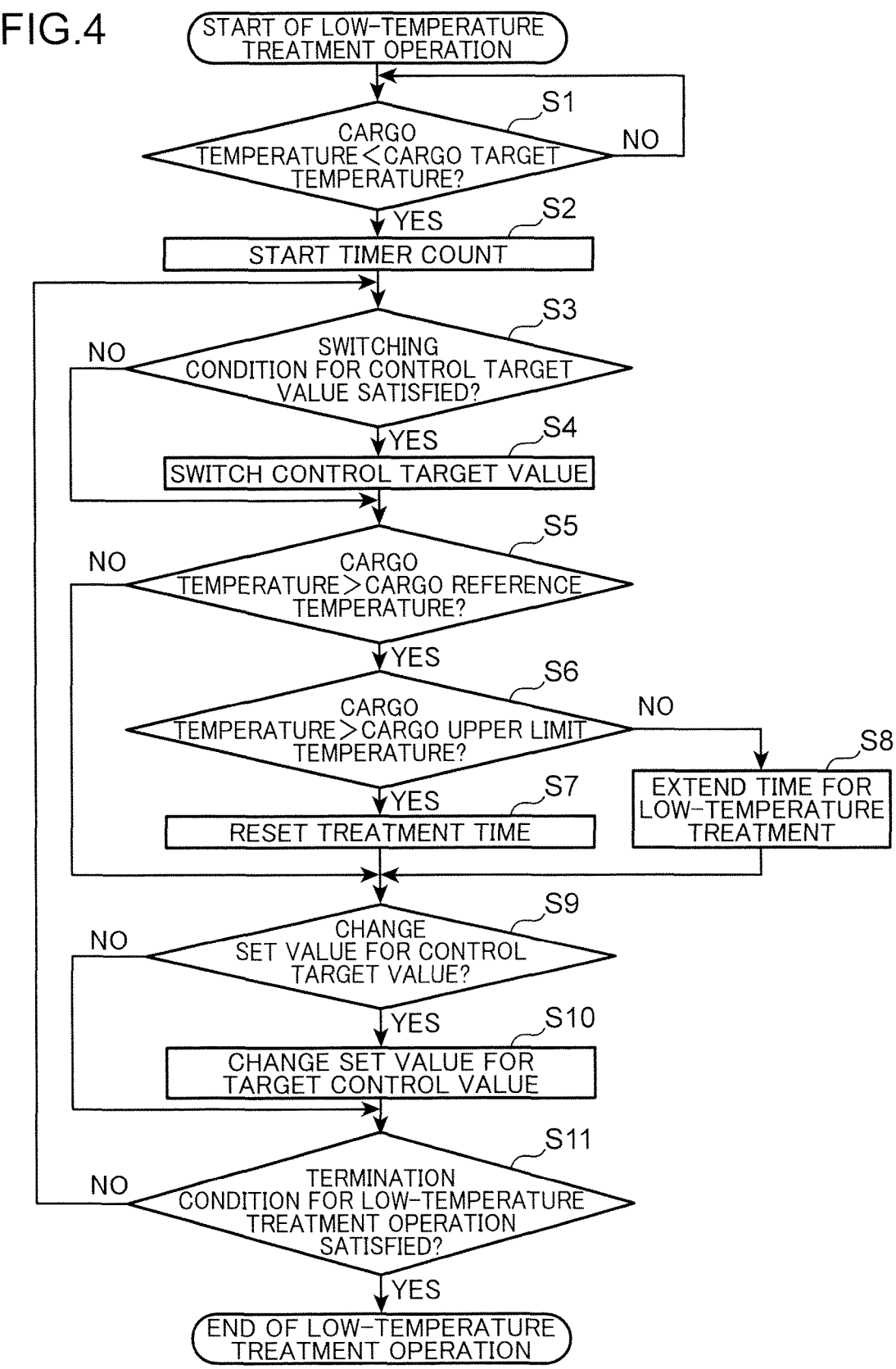
FIG. 4 is a flowchart for illustrating Control Example 1 carried out in low-temperature treatment operation in the refrigeration device according to the embodiment.
Figure 5:
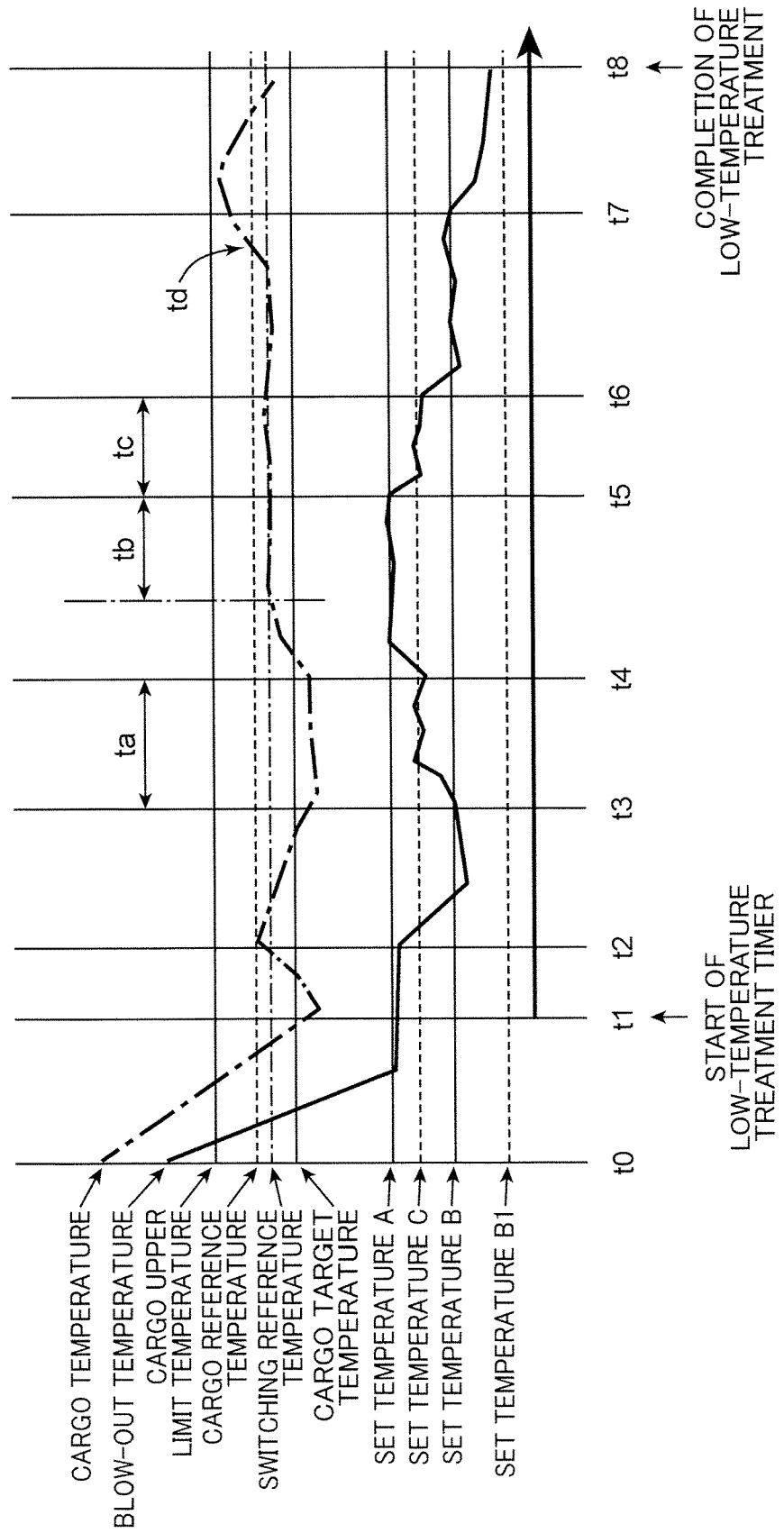
FIG. 5 is a view showing an example of change with time in the temperature of a cargo and the blow-out temperature in the low-temperature treatment operation.

FIG. 4 is a flowchart for illustrating Control Example 1 of the low-temperature treatment operation in the refrigeration device 1 according to the embodiment. FIG. 5 illustrates an example of change with time in the temperature of the cargo and the blow-out temperature when the low-temperature treatment operation is performed.

In Control Example 1 in FIG. 4, a plurality of set temperatures are predetermined as control target values for the blow-out temperature, and temperatures such as the cargo target temperature, the cargo reference temperature, the cargo upper limit temperature, and the switching reference temperature are predetermined as criterion for evaluating the temperature of the cargo. These values are stored in the storage unit 52.

The cargo target temperature is an ideal temperature (for example $-1.0°$ C.) as the temperature of the cargo in the low-temperature treatment operation.

The switching reference temperature is used as a condition for determining switching between control target values for the blow-out temperature. The switching reference temperature is a value used as a condition for previously determining the possibility of the temperature of the cargo increasing and exceeding the cargo reference temperature. Therefore, the switching reference temperature is lower than the cargo reference temperature by a predetermined value. The switching reference temperature is higher than the cargo target temperature and smaller than the cargo reference temperature.

In Control Example 1, the plurality of set temperatures include a set temperature A as a first set temperature, a set temperature B as a second set temperature, and a set temperature C as a third set temperature. The plurality of set temperatures may be predetermined values or values set by the user as required. In Control Example 1, the set temperature A is a value set as an upper limit temperature for the control target value for the blow-out temperature (for example −1.5° C.), and the set temperature B is a value set as a lower limit temperature for the control target value for the blow-out temperature (for example −2.0° C.). Note that as will be described, a set temperature B1 shown in FIG. 5 is set by changing the set temperature B as the lower limit temperature to a further lower temperature in order to prevent the temperature of the cargo from exceeding the cargo upper limit temperature.

In Control Example 1, at the start of the low-temperature treatment operation, the set temperature A is used as a control target value for the blow-out temperature. More specifically, at the start of the low-temperature treatment operation, the operation controller 51 controls the refrigerant circuit 10 so that the blow-out temperature approaches the set temperature A. The set temperature A is a value determined for example on the basis of actual transport experiences and experiments so that the temperature of the cargo in the interior S4 approaches the cargo target temperature.

In Control Example 1, a low temperature condition to be satisfied by the temperature of the cargo is set to be equal to or lower than a cargo reference temperature (for example −0.3° C.) but not limited to the temperature. Also in Control Example 1, the period for performing low-temperature treatment to the cargo is for example set to 24 days but not limited to the period. In Control Example 1, when the temperature of the cargo exceeds the cargo reference temperature, the time for low-temperature treatment of the cargo is extended for example by eight hours but the extension is not limited to the period.

As shown in FIGS. 4 and 5, when the low-temperature treatment operation starts (at time t0 in FIG. 5), the operation controller 51 controls the refrigerant circuit 10 so that the blow-out temperature approaches the set temperature A. As the refrigerant circuit 10 is controlled, the blow-out temperature decreases and approaches the set temperature A. The temperature of the cargo decreases and approaches the cargo target temperature accordingly.

If the temperature of the cargo is not less than the cargo target temperature (NO in step S1 in FIG. 4), counting by the low-temperature treatment timer is not started, and if the temperature of the cargo is lower than the cargo target temperature (YES in step S1), the time measurement unit 53 starts counting by the low-temperature treatment timer (step S2 in FIG. 4, at time t1 in FIG. 5).

Even if the blow-out temperature is stable around the control target value (for example the set temperature A) and the temperature of the cargo is lower than the cargo target temperature, the temperature of the cargo may increase again by, for instance, the effects of gas discharged from the cargo and the outdoor air temperature (for example at time t1 to time t2 in FIG. 5). The operation controller 51 continues to monitor the blow-temperature and the temperature of the cargo in order to prevent the temperature of the cargo from exceeding the cargo reference temperature and the cargo upper limit temperature.

More specifically, the operation controller 51 determines whether the switching condition between the control target values for the blow-out temperature is satisfied (step S3). If the switching condition is not satisfied (No in step S3), the operation controller 51 proceeds to control in step S5. If the switching condition is satisfied (YES in step S3), the setting switching unit 54 switches between the control target values for the blow-out temperature (step S4). Some specific examples of switching between the control target values in step S4 will be described.

Switching Example 1

The control target values are switched for example on the basis of the switching reference temperature. The setting switching unit 54 switches the control target values so that the control target value for the blow-out temperature is reduced. More specifically, for example as indicated by temperature change between time t1 and time t2 in FIG. 5, when the temperature of the cargo tends to increase and reaches the switching reference temperature, the setting switching unit 54 switches the control target value for example from the set temperature A to a set temperature lower than the set temperature A (for example the set temperature B). As a result, as indicated by temperature change between time t2 and time t3 in FIG. 5, the temperature of the cargo again tends to decrease and is prevented from exceeding the cargo reference temperature.

Switching Example 2

The control target values may be switched for example on the basis of the cargo target temperature. The setting switching unit 54 switches between the control target values on the basis of the cargo target temperature so that the control target value for the blow-out temperature increases. More specifically, as indicated by temperature change between time t2 and time t3 in FIG. 5, when the temperature of the cargo decreases and reaches the cargo target temperature after the control target value is switched to the set temperature B, the setting switching unit 54 switches the control target value for the blow-out temperature for example from the set temperature B to a set temperature higher than the set temperature B.

In this case, the setting switching unit 54 may directly switch the control target value for the blow-out temperature from the set temperature B to the set temperature A, while in Control Example 1, the control target value is switched from the set temperature B to the set temperature A stepwise. For example, as shown in FIG. 5, the control target value for the blow-out temperature is switched from the set temperature B to the set temperature C (at time t3 in FIG. 5), and then the control target value is switched from the set temperature C to the set temperature A (at time t4 in FIG. 5).

The condition for switching the control target value from the set temperature C to the set temperature A may be based on time elapsed from the time point in which the control target value is switched from the set temperature B to the set temperature C (at time t3 in FIG. 5). In this case, the setting switching unit 54 switches the control target value for the blow-out temperature from the set temperature C to the set temperature A after a predetermined period ta elapses from time t3 (period ta from time t3 to time t4 in the control example shown in FIG. 5).

Switching Example 3

As described above, at initial time when the low-temperature treatment timer starts to count (initial stage), the setting switching unit 54 is controlled to switch the control target value for the blow-out temperature directly from the set temperature A to the set temperature B (at time t2 in FIG. 5), while switching between the control target values based on the switching reference temperature is not limited to such control.

For example, as indicated by temperature change during the period from time t4 to time t6 in FIG. 5 (in a stage after the initial stage such as a stable stage), the setting switching unit 54 may switch the control target value for the blow-out temperature stepwise from the set temperature A to the set temperature B. More specifically, the setting switching unit 54 switches the control target value for the blow-out temperature from the set temperature A to the set temperature C (at time t5 in FIG. 5) and then from the set temperature C to the set temperature B (at time t6 in FIG. 5).

In Control Example 1 shown in FIG. 5, the setting switching unit 54 switches the control target value for the blow-out temperature from the set temperature A to the set temperature B stepwise (at time t5 in FIG. 5) when the temperature of the cargo reaches the switching reference temperature and then the temperature of the cargo continues to be equal to or higher than the switching reference temperature for a prescribed elapsed period tb but the switching is not limited to such control.

The setting switching unit 54 may switch the control target value for the blow-out temperature stepwise from the set temperature A to the set temperature B when the temperature of the cargo reaches the switching reference temperature.

The condition for switching the control target value from the set temperature C to the set temperature B may be based on time elapsed from the time point in which the control target value is switched from the set temperature A to the set temperature C (at time t5 in FIG. 5). In this case, the setting switching unit 54 switches the control target value for the blow-out temperature from the set temperature C to the set temperature B when the period tb elapsed from time t5 equals a predetermined period tc (period tc from time t5 to time t6 in the control example in FIG. 5).

The specific examples of switching between the control target values in steps S3 and S4 shown in FIG. 4 have been described, but the condition for switching the control target values for the blow-out temperature is not limited to the above specific examples.

Then, the operation controller 51 determines whether the temperature of the cargo exceeds the cargo reference temperature (step S5). If the temperature of the cargo exceeds the cargo reference temperature (YES in step S5), the operation controller 51 determines whether the temperature of the cargo exceeds the cargo upper limit temperature (step S6). If the temperature of the cargo exceeds the cargo upper limit temperature (YES in step S6), the time measurement unit 53 resets the count of the low-temperature treatment timer (step S7). If the temperature of the cargo does not exceed the cargo upper limit temperature (NO in step S6), the time measurement unit 53 extends the remaining low-temperature treatment time by a predetermined period (for example by eight hours) (step S8).

As described above, in step S4, when the control target value for the blow-out temperature is switched to the set temperature B as the lower limit temperature (at time t6 in FIG. 5), the temperature of the cargo decreases in response to the switching and approaches to the cargo target temperature in some cases, while this may not happen in other cases. For example, as indicated by temperature change between time t6 and time t7 in FIG. 5, the temperature of the cargo may not decrease sufficiently for example because of the effects of gas discharged from the cargo and the outdoor air temperature even though the control target value for the blow-out temperature is switched to the set temperature B.

In an example of the temperature change between time t6 and time t7 in FIG. 5, the temperature of the cargo gradually increases and exceeds the cargo reference temperature at time td, and therefore the time measurement unit 53 extends the remaining time for low-temperature treatment for example by eight hours (step S8). In this case, in Control Example 1, the set temperature B as the lower limit temperature is preferably changed to a smaller value in order to prevent the temperature of the cargo from further increasing and exceeding the cargo upper limit temperature.

The setting change may be automatically carried out for example by the setting changing unit 55 when the temperature of the cargo exceeds the cargo reference temperature. In this case, if the temperature of the cargo exceeds the cargo reference temperature (YES in step S9), the setting changing unit 55 changes the set temperature B to a smaller value (for example the set temperature B1) (step S10).

The setting change may be carried out in response to an instruction from the user. In this case, the setting changing unit 55 accepts for example setting change about the set temperature B in response to an input by the user and setting change about the set temperature B through a communication means (YES in step S9) and changes the set temperature B to the accepted value (step S10). In Control Example 1 shown in FIG. 5, the setting changing unit 55 changes the set temperature B as the lower limit temperature for the control target value to the set temperature B1 according to an instruction from the user (step S10). The set temperature B1 is a value smaller than the set temperature B.

The user can also be aware that the temperature of the cargo exceeds the cargo reference temperature as follows. The user can be aware that the temperature of the cargo exceeds the cargo reference temperature by visual inspection of the transition of the temperature of the cargo indicated at the screen for example by the indicator 57. When for example the temperature of the cargo exceeds the cargo reference temperature, the user can also be aware of the situation by a warning issued by the warning unit 56.

The operation controller 51 then determines whether the termination condition for the low-temperature treatment operation is satisfied (step S11). If the termination condition for the low-temperature treatment operation is satisfied (YES in step S11), the operation controller 51 performs control so that the low-temperature treatment operation ends (at time t8 in FIG. 5) and the operation proceeds to normal operation such as the chilled state operation and the frozen state operation. If the termination condition for the low-temperature treatment operation is not satisfied (NO in step S11), the operation controller 51 controls the refrigerant circuit 10 so that the series of the steps of low-temperature treatment operation are continued.

An example of the termination condition for the low-temperature treatment operation may include a condition based on a period in which the cargo is subjected to low-temperature treatment, in other words time required for completion of the treatment (for example 24 days). The time required for completion of the treatment is a predetermined value. Therefore, the operation controller 51 ends the low-temperature treatment operation if the treatment time for the low-temperature treatment operation has reached the treatment completion time (YES in step S11), and if the treatment time for the low-temperature treatment has not reached the treatment completion time (No in step S11), the low-temperature treatment operation is continued.

Control Example 2

Figure 6:
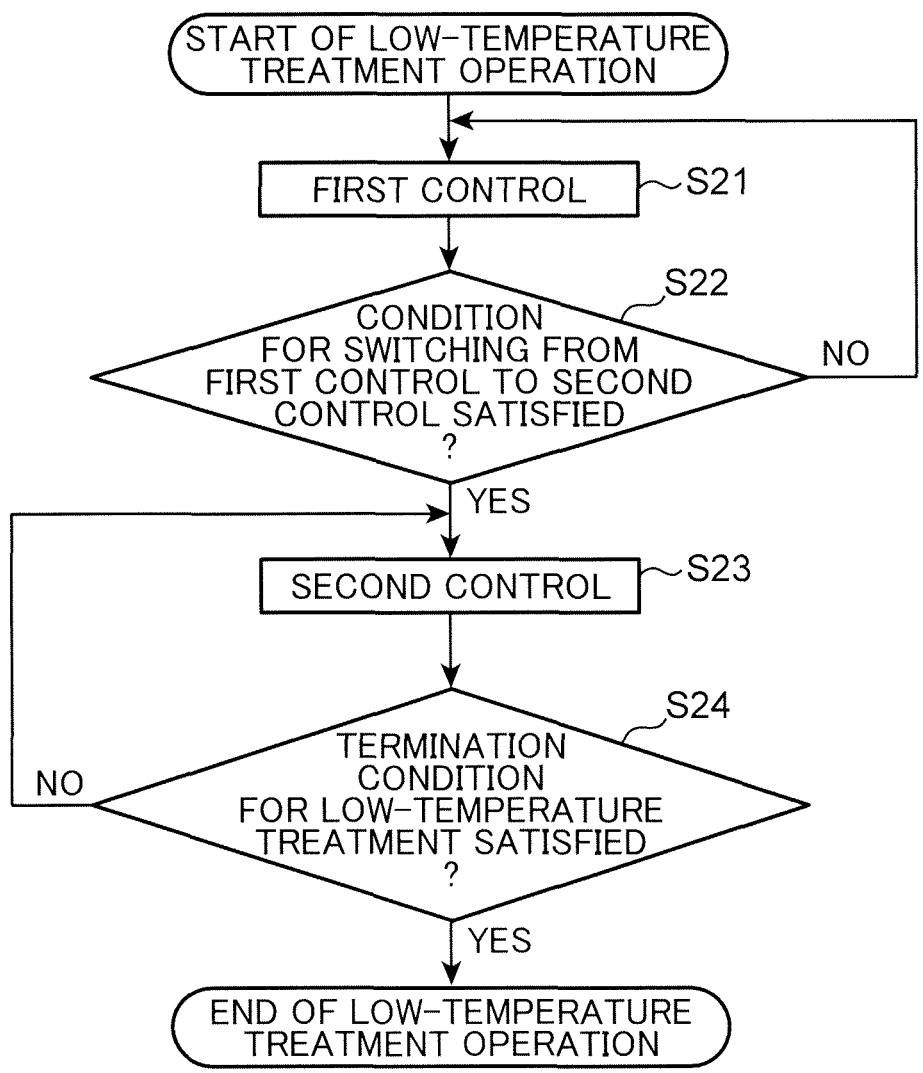
FIG. 6 is a flowchart for illustrating Control Example 2 carried out in the low-temperature treatment operation in the refrigeration device according to the embodiment.

FIG. 6 is a flowchart for illustrating Control Example 2 of low-temperature treatment operation in the refrigeration device 1 according to the embodiment. Control Example 2 is different from Control Example 1 in the following points. More specifically, in Control Example 1, the target value for the blow-out temperature is set as a control target value, the refrigerant circuit 10 is controlled so that the blow-out temperature approaches the control target value. In the meantime, in Control Example 2 that will be described, the refrigerant circuit 10 is controlled so that the same control as Control Example 1 is performed in an initial stage after the low-temperature treatment operation is started, but if a predetermined condition is satisfied, the target value for the temperature of the cargo is set as a control target value, and the temperature of the cargo approaches the cargo target temperature.

As shown in FIG. 6, at the start of the low-temperature treatment operation, the operation controller 51 performs first control (step S21). In the first control, the refrigerant circuit 10 is controlled so that the target value for the blow-out temperature is set as a control target value, and the blow-out temperature approaches the control target value, which is the same as Control Example 1 shown in FIGS. 4 and 5. Therefore, a detailed description of the first control is not provided.

In Control Example 2, the operation controller 51 determines whether a condition for switching from the first control to second control is satisfied (step S22) while performing the first control. More specifically, the determination in step S22 shown in FIG. 6 is performed after any of the steps in the first control shown in FIG. 4. More specifically, the determination in step S22 is performed after any one of steps S1 to S11 in the first control in FIG. 4. If the condition for switching from the first control to the second control is not satisfied (No in step S22), the operation controller 51 continues the first control. If the condition for switching from the first control to the second control is satisfied (YES in step S22), the operation controller 51 switches from the first control to the second control (step S23).

The condition for switching from the first control to the second control (the predetermined condition) may include, but not particularly limited to, the following specific examples.

The condition for switching from the first control to the second control may preferably include an indication that the temperature of the cargo reaches the cargo target temperature and a stable state is attained as a result. In such a stable stage, the occurrence of troubles attributable to low responsiveness related to the temperature of the cargo can be reduced. In the low-temperature treatment operation, an example of the condition for determining the attainment of the stable stage may be based on the state in which time elapsed from the start of the low-temperature treatment operation has reached a predetermined period. Another example of the condition for determining the attainment of the stable stage may be based on the state in which time elapsed from the start of counting by the low-temperature treatment timer has reached a predetermined period. Another example of the condition for determining the attainment of the stable stage may be based on the state in which the temperature of the cargo continues to be within a predetermined range for a predetermined period.

Then, the operation controller 51 determines whether the termination condition for the low-temperature treatment operation is satisfied (step S24). If the termination condition for the low-temperature treatment operation is satisfied (YES in step S24), the operation controller 51 performs control to end the low-temperature treatment operation and proceed to normal operation such as the chilled state operation and the frozen state operation. If the termination condition for the low-temperature treatment operation is not satisfied (No in step S24), the operation controller 51 controls the refrigerant circuit 10 to continue the second control. The termination condition for the low-temperature treatment operation is the same as that in Control Example 1 and therefore a description thereof is not provided.

Summary of Embodiments

According to the embodiment, the refrigeration device is controlled by the operation controller 51 on the basis of a temperature detected by the blow-out temperature detector SS and a temperature detected by the cargo temperature sensor CS to refrigerate the interior so that the temperature of the cargo satisfies the low temperature condition in the low-temperature treatment operation, and therefore the temperature of the cargo is automatically adjusted to satisfy the low temperature condition. In this way, during low-temperature treatment of a cargo, the low-temperature treatment can surely be performed without failures, and the cumbersome works by the user can be eliminated.

According to the embodiment, when the low-temperature treatment operation is started, the operation controller 51 controls the refrigerant circuit 10 so that the blow-out temperature approaches the set temperature A. When the temperature of the cargo is less than the cargo target temperature, the time measurement unit 53 starts measuring treatment time. More specifically, according to the embodiment, when the starting condition (under which the temperature of the cargo is lower than the cargo target temperature) is satisfied, the measuring of the treatment time by the time measurement unit 53 is automatically started. Therefore, the embodiment can save the user the cumbersome works of manually starting counting by the low-temperature treatment timer when the temperature of the cargo is lower than the cargo target temperature in the low-temperature treatment operation.

According to the embodiment, when the temperature of the cargo reaches the switching reference temperature after the measurement of the treatment time is started, the control target value for the blow-out temperature is switched from the set temperature A to the set temperature B, and therefore refrigeration of the interior S4 can be enhanced when the temperature of the cargo tends to increase in the low-temperature treatment operation. In this way, after the measurement of the treatment time is started in the low-temperature treatment operation, the temperature of the cargo can be restrained from increasing and the temperature of the cargo can be adjusted to be within an appropriated range.

According to the embodiment, when the target control value for the blow-out temperature is switched from the set temperature A to the set temperature B, the control target value for the blow-out temperature is lowered stepwise, so that a sudden temperature drop in the interior S4 can be reduced. In this way, fluctuations in the temperature in the interior S4 can be reduced, and therefore the object of adjusting the temperature of the cargo within an appropriate target range can be more readily achieved.

According to the embodiment, when the temperature of the cargo reaches the cargo target temperature after the control target value for the blow-out temperature is switched to the set temperature B and refrigeration in the interior S4 is enhanced, the control target value for blow-out temperature is returned to the set temperature A and refrigeration in the interior S4 is weakened. In this way, in the low-temperature treatment operation, the object of adjusting the temperature of the cargo to be within an appropriate target range by reducing excessive drops in the temperature of the cargo can be even more readily achieved.

According to the embodiment, when the control target value for the blow-out temperature is switched from the set temperature B to the set temperature A, the control target value for the blow-out temperature is raised stepwise, so that sudden temperature rises in the interior S4 can be reduced. In this way, temperature fluctuations in the interior S4 can be reduced, so that the object of adjusting the temperature of the cargo within an appropriate target range can be even more readily achieved.

According to the embodiment, there is provided a setting changing unit 55 configured to accept at least one of setting change for the control target value by an input from the user and setting change for the control target value through a communication means and change the control target value to the accepted value. The set temperature B is changed to the value accepted by the setting changing unit 55. Therefore, for example even after the control target value for the blow-out temperature is switched from the set temperature A to the set temperature B, when the effect of restraining rises in the temperature of the cargo is not sufficiently provided, the set value for the set temperature B may be changed to a smaller value by at least one of an input from the user or through a communication means. In this way, the effect of reducing rises in the temperature of the cargo can be increased.

According to the embodiment, the treatment time is reset when the temperature of the cargo exceeds the cargo upper limit temperature. More specifically, in the low-temperature treatment operation, the treatment time is automatically measured when the temperature of the cargo is within an appropriate target range, while the treatment time measured up to the point is reset when the temperature of the cargo is outside the target range and exceeds the cargo upper limit temperature, and therefore inappropriate time can be prevented from being added to the treatment time in the course of low-temperature treatment. Therefore, according to the embodiment, the treatment time can be measured appropriately and automatically. When the temperature of the cargo is again below the cargo target temperature after the treatment time is reset, the time measurement unit 53 can start measuring the treatment time all over again.

According to the embodiment, when the warning condition including the state in which the temperature of the cargo exceeds the cargo upper limit temperature is satisfied, the warning unit 56 issues a warning, so that the user can be quickly notified of the resetting of the treatment time. In this way, the user can quickly execute appropriate treatment to the refrigeration device so that the temperature of the cargo is within an appropriate temperature range.

According to the embodiment, the time for low-temperature treatment of the cargo is extended by a predetermined period when the temperature of the cargo exceeds the cargo reference temperature. More specifically, according to the embodiment, while the treatment time is automatically measured when the temperature of the cargo is within an appropriate target range, the remaining time until the end of the low-temperature treatment is automatically extended in order to perform sufficient low-temperature treatment to the cargo when the temperature of the cargo is outside the target range and exceeds the cargo reference temperature.

In Control Example 2 according to the embodiment, the operation controller 51 may perform the first control in which the refrigerant circuit 10 is controlled so that the target value for the blow-out temperature is set as a control target value and the blow-out temperature approaches the control target value for the blow-out temperature when the low-temperature treatment operation is started, and when a predetermined condition is satisfied, the operation controller may switch to the second control in which the refrigerant circuit 10 is controlled so that the cargo target temperature is set as a control target value and the temperature of the cargo approaches the cargo target temperature.

The responsiveness of cargo temperature decrease to the control by the refrigerant circuit 10 (for example the responsiveness of temperature decrease inside a solid such as a fruit in particular) tends to be lower than the responsiveness of temperature decrease in the blow-out temperature to the control by the refrigerant circuit 10. If for example a target value for the temperature of a cargo with low responsiveness is set as a control target value in an early stage after the start of low-temperature treatment operation, the interior S4 may be excessively refrigerated and the temperature of the cargo may drop excessively. Therefore, in the configuration, in the early stage after the start of the low-temperature treatment operation, the first control is carried out, in which the refrigerant circuit 10 is controlled so that a target value for the blow-out temperature with high responsiveness is set as a control target value and the blow-out temperature approaches the control target value.

In the meantime, when a predetermined condition (under which the temperature of the cargo reaches the cargo target temperature and attains a stable state for example) is satisfied, the occurrence of troubles attributable to low responsiveness related to the temperature of the cargo can be reduced. In the stable stage in which the condition is satisfied, the control is switched to the second control in which a target value for the temperature of the cargo is set as a control target value and a cargo target temperature is set as a control target value. In the second control, the temperature of the cargo is not adjusted indirectly through adjustment of the blow-out temperature as in the first control, but the temperature of the cargo is directly adjusted to approach the cargo target temperature on the basis of a detection result of the temperature of the cargo. In this way, in the second control carried out in the stable stage, the refrigerant circuit 10 can be controlled on the basis of actual temperature change of the cargo to be subjected to low-temperature treatment, so that the temperature of the cargo can be more accurately adjusted.

According to the embodiment, the operation controller 51 controls the refrigerant circuit 10 to increase the flow amount of the refrigerant to be passed to the evaporator 14 and raise the refrigeration capability when the blow-out temperature is higher than a control target value for the blow-out temperature, and the operation controller controls the refrigerant circuit 10 to lower the flow amount of the refrigerant to be passed to the evaporator 14 and lower the refrigeration capability when the blow-out temperature is lower than the control target value for the blow-out temperature. In this way, the blow-out temperature can be adjusted by regulating the flow amount of refrigerant to be passed to the evaporator 14.

According to the embodiment, the flow amount of refrigerant may be regulated by regulating the flow amount of refrigerant discharged from the compressor 11 by adjusting the operation capacity of the compressor 11 in the refrigerant circuit 10, while the flow amount of refrigerant may be regulated by regulating the flow amount of refrigerant discharged from the compressor 11 by adjusting the opening degree of the regulating valve 35 provided on the suction side of the compressor 11 in the refrigerant circuit 10.

According to the embodiment, the indicator 57 indicates a data piece extracted from accumulated data pieces related to the low-temperature treatment operation, and therefore the user can get readily hold of data indicating for example normal operation of low-temperature treatment, an abnormality occurring in the low-temperature treatment, the treatment time for the low-temperature treatment, and the remaining time for the low-temperature treatment. Note that the kinds of data to be extracted may be set by the user as required.

Other Modifications

While the embodiment of the present invention has been described, the invention is not limited to the above, and various modifications, variations, and the like can be carried out without departing the gist of the invention.

For example, according to the embodiment, the exemplary controller 50 includes the operation controller 51, the storage unit 52, the time measurement unit 53, the setting switching unit 54, the setting changing unit 55, the warning unit 56, and the indicator 57 as functions but the configuration is not limited to this. The controller 50 may be formed without providing one or all of the setting switching unit 54, the setting changing unit 55, the warning unit 56, and the indicator 57.

According to the embodiment, the exemplary case in which the refrigeration device 1 refrigerates the interior of a container for use in marine transport and the like has been described, while the refrigeration device 1 may have other uses than the container for marine transport and the like. For example, the refrigeration device 1 may be used for refrigerating the interior of a warehouse and the like.

The embodiment will be summarized as follows.

A refrigeration device according to the embodiment includes a refrigerant circuit having an evaporator and performs low-temperature treatment operation for treating a cargo in an interior of the device under a predetermined low-temperature condition. The refrigeration device includes a blow-out temperature detector, a cargo temperature detector, an operation controller, a storage unit, and a time measurement unit. The blow-out temperature detector detects a blow-out temperature of air which is cooled in the evaporator and blown out into the interior. The cargo temperature detector detects a temperature of the cargo. The operation controller performs cooling control of the interior on the basis of the temperature detected by the blow-out temperature detector and the temperature detected by the cargo temperature detector so that the temperature of the cargo satisfies the low temperature condition in the low-temperature treatment operation. The storage unit stores a first set temperature as a control target value for the blow-out temperature in the low-temperature treatment operation and a cargo target temperature as a target value for the temperature of the cargo in the low-temperature treatment operation.

The time measurement unit measures treatment time elapsed for low-temperature treatment of the cargo in the low-temperature treatment operation. The operation controller is configured to control the refrigerant circuit so that the blow-out temperature approaches the first set temperature upon starting the low-temperature treatment operation. The time measurement unit is configured to start measuring the treatment time when the temperature of the cargo is lower than the cargo target temperature upon starting the low-temperature treatment operation.

In this configuration, since the refrigeration device is controlled by the operation controller on the basis of the temperature detected by the blow-out temperature detector and the temperature detected by the cargo temperature detector and the interior is refrigerated so that the temperature of the cargo satisfies the low temperature condition in the low-temperature treatment operation, the temperature of the cargo is automatically adjusted to satisfy the low-temperature condition. More specifically, in this configuration, when the refrigeration device is automatically controlled by the operation controller in the low-temperature treatment operation, not only fluctuations in the temperature detected by the blow-out temperature detector but also fluctuations in the temperature detected by the cargo temperature detector are taken into consideration. Therefore, the configuration saves the user the cumbersome works of manually adjusting the set temperature for the blow-out temperature from time to time while periodically or continuously monitoring the temperature of the cargo as is with the conventional method. In this way, during transport of a cargo such as fruits, the low-temperature treatment can surely be performed, and the cumbersome works by the user during the low-temperature treatment of the cargo can be eliminated.

In this configuration, the operation controller controls the refrigerant circuit so that the blow-out temperature approaches the first set temperature when the low-temperature treatment is started. The time measurement unit starts measuring treatment time when the temperature of the cargo is lower than the cargo target temperature. More specifically, in the configuration, when the starting condition (in which the temperature of the cargo is lower than the cargo target temperature) is satisfied, the time measuring unit automatically starts measuring the treatment time. Therefore, the configuration can save the user the cumbersome works of manually starting counting by the low-temperature treatment timer when the temperature of the cargo is lower than the cargo target temperature in the low-temperature treatment operation.

Preferably, the refrigeration device includes a setting switching unit that switches control target values for the blow-out temperature in the low-temperature treatment operation, the storage unit stores a second set temperature lower than the first set temperature as a control target value for the blow-out temperature in the low-temperature treatment operation and a switching reference temperature higher than the cargo target temperature, and the setting switching unit is configured to switch the control target value for the blow-out temperature from the first set temperature to the second set temperature when the temperature of the cargo reaches the switching reference temperature after the time measurement unit starts measuring the treatment time.

In the configuration, the control target value for the blow-out temperature is switched from the first set temperature to the second set temperature when the temperature of the cargo reaches the switching reference temperature after the time measurement unit starts measuring the treatment time, and therefore refrigeration of the interior can be enhanced when the temperature of the cargo tends to increase. In this way, after the time measurement unit starts measuring the treatment time in the low-temperature treatment operation, the temperature of the cargo can be restrained from rising and adjusted to be within an appropriate target range.

In the refrigeration device, the setting switching unit is preferably configured to lower the control target value for the blow-out temperature from the first set temperature to the second set temperature in a step-by-step manner when the setting switching unit switches the control target value for the blow-out temperature from the first set temperature to the second set temperature.

In this configuration, the control target value for the blow-out temperature is lowered in a step-by-step manner, and therefore sudden temperature drops in the interior can be reduced. In this way, fluctuations in the temperature of the interior can be reduced, so that the object of adjusting the temperature of the cargo within an appropriate target range can be more readily achieved.

In the refrigeration device, the setting switching unit is preferably configured to switch the control target value for the blow-out temperature from the second set temperature to the first set temperature when the temperature of the cargo reaches the cargo target temperature after the setting switching unit switches the control target value for the blow-out temperature to the second set temperature.

In the configuration, the control target value for the blow-out temperature is switched to the second set temperature, so that refrigeration of the interior is enhanced, and then the control target value for the blow-out temperature is returned to the first set temperature when the temperature of the cargo reaches the cargo target temperature, so that the refrigeration of the interior is weakened. In this way, in the low-temperature treatment operation, excessive drops in the temperature of the cargo can be reduced and the object of adjusting the temperature of the cargo within the appropriate target range can be even more readily achieved.

In the refrigeration device, the setting switching unit is preferably configured to raise the control target value for the blow-out temperature from the second set temperature to the first set temperature in a step-by-step manner when the setting switching unit switches the control target value for the blow-out temperature from the second set temperature to the first set temperature.

In the configuration, since the control target value for the blow-out temperature is increased stepwise, sudden temperature rises in the interior can be reduced. In this way, fluctuations in the temperature of the interior can be reduced, and therefore the object of adjusting the temperature of the cargo within the appropriate target range can be even more readily achieved.

The refrigeration device preferably includes a setting changing unit that accepts at least one of setting change for the control target value by an input from a user and setting change for the control target value via a communication means, and changes the control target value to the accepted value.

In this configuration, the second set temperature is changed to the value accepted by the setting changing unit. Therefore, even after the control target value for the blow-out temperature is switched from the first set temperature to the second set temperature for example, when the effect of restraining rises in the temperature of the cargo is not sufficiently provided, the set value for the second set temperature may be changed to a smaller value by at least one of an input from the user or an input through a communication means. In this way, the effect of restraining rises in the temperature of the cargo can be improved.

In the refrigeration device, the storage unit may store a cargo upper limit temperature, which is higher than the cargo target temperature, and the time measurement unit may be configured to reset the treatment time measured up to a point in time when the temperature of the cargo exceeds the cargo upper limit temperature after the time measurement unit starts measuring the treatment time.

In the configuration, the treatment time is reset when the temperature of the cargo exceeds the cargo upper limit temperature. More specifically, in the low-temperature treatment operation, the treatment time is automatically measured when the temperature of the cargo is within an appropriate target range, while the treatment time measured up to the point is reset when the temperature of the cargo is outside the target range and exceeds the cargo upper limit temperature, and therefore inappropriate time can be prevented from being added to the treatment time in the course of low-temperature treatment. Therefore, in the configuration, the treatment time can be measured appropriately and automatically. In addition, when the temperature of the cargo is again below the cargo target temperature after the treatment time is reset, the time measurement unit can start measuring the treatment time all over again.

The refrigeration device preferably includes a warning unit issues a warning when a warning condition is satisfied, and the warning condition includes a state in which the temperature of the cargo exceeds the cargo upper limit temperature.

In the configuration, when the warning condition is satisfied, the warning unit issues a warning, the user can be quickly notified of the resetting of the treatment time. In this way, the user can carry out an appropriate treatment to the refrigeration device so that the temperature of the cargo is within the appropriate range.

Preferably, in the refrigeration device, the storage unit stores a cargo reference temperature, which is higher than the cargo target temperature, and the time measurement unit is configured to extend a time for performing low-temperature treatment on the cargo by a predetermined period when the temperature of the cargo exceeds the cargo reference temperature after the time measurement unit starts measuring the treatment time.

In the configuration, the time for low-temperature treatment of the cargo is extended by a predetermined period when the temperature of the cargo exceeds the cargo reference temperature. More specifically, in the configuration, while the treatment time is automatically measured when the temperature of the cargo is within an appropriate target range, the remaining time until the end of the low-temperature treatment is automatically extended in order to perform sufficient low-temperature treatment to the cargo when the temperature of the cargo is outside the target range and exceeds the cargo reference temperature.

In the refrigeration device, the operation controller may be configured to perform first control in which the refrigerant circuit is controlled so that the blow-out temperature approaches the control target value when the low-temperature treatment operation is started and switch to second control, when a predetermined condition is satisfied, in which the refrigerant circuit is controlled so that the cargo target temperature as a target value for the temperature of the cargo in the low-temperature treatment operation is set as a control target value and the temperature of the cargo approaches the cargo target temperature.

The responsiveness of cargo temperature decrease to the control by the refrigerant circuit (for example the responsiveness of temperature decrease inside a solid such as a fruit in particular) tends to be lower than the responsiveness of temperature decrease in the blow-out temperature to the control by the refrigerant circuit. If for example a target value for the temperature of a cargo with low responsiveness is set as a control target value in an early stage after the start of low-temperature treatment operation, the interior may be excessively refrigerated and the temperature of the cargo may drop excessively. Therefore, in the configuration, in the early stage after the start of the low-temperature treatment operation, the first control is carried out, in which the refrigerant circuit is controlled so that a target value for the blow-out temperature with high responsiveness is set as a control target value and the blow-out temperature approaches the control target value.

In the meantime, when a predetermined condition (under which the temperature of the cargo reaches the cargo target temperature and attains a stable state for example) is satisfied, the occurrence of troubles attributable to low responsiveness related to the temperature of the cargo can be reduced. In the stable stage in which the condition is satisfied, the control is switched to the second control in which the refrigerant circuit is controlled so that the target value for the temperature of the cargo is set as a control target value and the temperature of the cargo approaches the control target value (cargo target temperature). In the second control, the temperature of the cargo is not adjusted indirectly through adjustment of the blow-out temperature as in the first control, but the temperature of the cargo is directly adjusted to approach the cargo target temperature on the basis of a detection result of the temperature of the cargo. More specifically, in the second control, the blow-out temperature is not taken into consideration and the refrigerant circuit is controlled on the basis of a detection result of the temperature of the cargo so that the temperature of the cargo approaches the cargo target temperature. In this way, in the second control carried out in the stable stage, the refrigerant circuit can be controlled on the basis of actual temperature change of the cargo to be subjected to low-temperature treatment, so that the temperature of the cargo can be more accurately adjusted.

In the refrigeration device, the operation controller is preferably configured to control the refrigerant circuit to increase the flow amount of refrigerant passed to the evaporator in order to increase refrigeration capability when the blow-out temperature is higher than the control target value for the blow-out temperature, and control the refrigerant circuit to reduce the flow amount of refrigerant passed to the evaporator in order to lower the refrigeration capability when the blow-out temperature is lower than the control target value for the blow-out temperature.

In this configuration, the blow-out temperature can be adjusted by regulating the flow amount of refrigerant passed to the evaporator.

In the refrigeration device, the flow amount of refrigerant may be regulated by regulating the flow amount of refrigerant discharged from a compressor in the refrigerant circuit by adjusting an operation capacity of the compressor, while the flow amount of refrigerant may be regulated by regulating the flow amount of refrigerant discharged from the compressor by adjusting the opening degree of a suction regulating valve provided on the suction side of the compressor in the refrigerant circuit.

The refrigeration device preferably includes an indicator that indicates a data piece extracted from accumulated data pieces related to the low-temperature treatment operation.

In the configuration, a data piece extracted from accumulated data pieces related to the low-temperature treatment operation is indicated by the indicator, and therefore the user can get readily hold of data indicating for example normal operation of low-temperature treatment, an abnormality occurring in the low-temperature treatment, the treatment time for the low-temperature treatment, and the remaining time for the low-temperature treatment. Note that the kinds of data may be set by the user as required.

The invention claimed is:

1. A refrigeration device which comprises a refrigerant circuit including an evaporator, and which performs low-temperature treatment operation for treating a cargo in an interior of the device under a predetermined low-temperature condition, the refrigeration device comprising:
a blow-out temperature detector that detects a blow-out temperature of air which is cooled in the evaporator and blown out into the interior;
a cargo temperature detector that detects a temperature of the cargo;
a memory; and
a central processing unit that runs control programs stored in the memory, and performs cooling control of the interior on the basis of the temperature detected by the blow-out temperature detector and the temperature detected by the cargo temperature detector so that the temperature of the cargo satisfies the low-temperature condition in the low-temperature treatment operation, wherein
the memory stores a first set temperature as a control target value for the blow-out temperature in the low-temperature treatment operation and a cargo target temperature as a target value for the temperature of the cargo in the low-temperature treatment operation,
the central processing unit measures a treatment time elapsed for low-temperature treatment of the cargo in the low-temperature treatment operation,
the central processing unit controls the refrigerant circuit so that the blow-out temperature approaches the first set temperature upon starting the low-temperature treatment operation, and
the central processing unit starts measuring the treatment time when the temperature of the cargo is lower than the cargo target temperature upon starting the low-temperature treatment operation.

2. The refrigeration device according to claim 1, wherein
the central processing unit switches control target values for the blow-out temperature in the low-temperature treatment operation,
the memory stores
a second set temperature lower than the first set temperature as a control target value for the blow-out temperature in the low-temperature treatment operation and
a switching reference temperature higher than the cargo target temperature,
the central processing unit switches the control target value for the blow-out temperature from the first set temperature to the second set temperature when the temperature of the cargo reaches the switching reference temperature after the central processing unit starts measuring the treatment time.

3. The refrigeration device according to claim 2, wherein the central processing unit lowers the control target value for the blow-out temperature from the first set temperature to the second set temperature in a step-by-step manner when the central processing unit switches the control target value for the blow-out temperature from the first set temperature to the second set temperature.

4. The refrigeration device according to claim 2, wherein the central processing unit switches the control target value for the blow-out temperature from the second set temperature to the first set temperature when the temperature of the cargo reaches the cargo target temperature after the central processing unit switches the control target value for the blow-out temperature to the second set temperature.

5. The refrigeration device according to claim 4, wherein the central processing unit raises the control target value for the blow-out temperature from the second set temperature to the first set temperature in a step-by-step manner when the central processing unit switches the control target value for the blow-out temperature from the second set temperature to the first set temperature.

6. The refrigeration device according to claim 2, wherein the central processing unit accepts at least one of setting change for the control target value by an input from a user and setting change for the control target value via communication means, and changes the control target value to the accepted value.

7. The refrigeration device according to claim 1, wherein the memory stores a cargo upper limit temperature which is higher than the cargo target temperature, and
the central processing unit resets the treatment time measured up to a point in time when the temperature of the cargo exceeds the cargo upper limit temperature after the central processing unit starts measuring the treatment time.

8. The refrigeration device according to claim 7, wherein the central processing unit issues a warning when a warning condition is satisfied, the warning condition including a state in which the temperature of the cargo exceeds the cargo upper limit temperature.

9. The refrigeration device according to claim 1, wherein the memory stores a cargo reference temperature which is higher than the cargo target temperature, and
the central processing unit extends a time for performing low-temperature treatment on the cargo by a predetermined period when the temperature of the cargo exceeds the cargo reference temperature after the central processing unit starts measuring the treatment time.

10. The refrigeration device according to claim 1, wherein the central processing unit performs first control in which the refrigerant circuit is controlled so that the blow-out temperature approaches the control target value when the low-temperature treatment operation is started, and
switches to second control in which the refrigerant circuit is controlled so that the cargo target temperature as a target value for the temperature of the cargo in the low-temperature treatment operation is set as a control target value and the temperature of the cargo approaches the cargo target temperature, when a predetermined condition is satisfied.

11. The refrigeration device according to claim 1, wherein the central processing unit controls the refrigerant circuit to increase a flow amount of refrigerant passed to the evaporator in order to increase refrigeration capability when the blow-out temperature is higher than the control target value for the blow-out temperature, and
control the refrigerant circuit to reduce the flow amount of refrigerant passed to the evaporator in order to lower the refrigeration capability when the blow-out temperature is lower than the control target value for the blow-out temperature.

12. The refrigeration device according to claim 11, wherein the flow amount of refrigerant is regulated by regulating a flow amount of refrigerant discharged from a compressor in the refrigerant circuit by adjusting an operation capacity of the compressor.

13. The refrigeration device according to claim 11, wherein the flow amount of refrigerant is regulated by regulating the flow amount of refrigerant discharged from the compressor by adjusting an opening degree of a suction regulating valve provided on a suction side of the compressor in the refrigerant circuit.

14. The refrigeration device according to claim 1, wherein the central processing unit indicates a data piece extracted from accumulated data pieces related to the low-temperature treatment operation.

* * * * *